(12) United States Patent
Jokinen

(10) Patent No.: US 12,054,009 B2
(45) Date of Patent: Aug. 6, 2024

(54) TREAD BLOCK ARRANGEMENT HAVING A SIPE

(71) Applicant: NOKIAN RENKAAT OYJ, Nokia (FI)

(72) Inventor: Mikko Jokinen, Tampere (FI)

(73) Assignee: NOKIAN RENKAAT OYJ, Nokia (FI)

( * ) Notice: Subject to any disclaimer, the term of this patent is extended or adjusted under 35 U.S.C. 154(b) by 0 days.

(21) Appl. No.: 18/172,934

(22) Filed: Feb. 22, 2023

(65) Prior Publication Data
US 2023/0264520 A1      Aug. 24, 2023

(30) Foreign Application Priority Data
Feb. 23, 2022   (EP) ..................................... 22158118

(51) Int. Cl.
*B60C 11/12*      (2006.01)
*B60C 11/03*      (2006.01)
*B29D 30/06*      (2006.01)

(52) U.S. Cl.
CPC ...... *B60C 11/1204* (2013.01); *B60C 11/0302* (2013.01); *B60C 11/0306* (2013.01); *B60C 11/1218* (2013.01); *B60C 11/1281* (2013.01); *B29D 2030/0613* (2013.01); *B60C 2011/1213* (2013.01)

(58) Field of Classification Search
CPC ............. B60C 11/0302; B60C 11/1218; B60C 11/1281; B60C 2011/1213; B29D 2030/0613
See application file for complete search history.

(56) References Cited

U.S. PATENT DOCUMENTS

| | | | | |
|---|---|---|---|---|
| 4,200,134 A | * | 4/1980 | Takigawa | B60C 11/04 152/209.27 |
| 4,345,632 A | * | 8/1982 | Takigawa | B60C 11/042 152/209.19 |
| 4,703,787 A | * | 11/1987 | Ghilardi | B60C 11/042 152/DIG. 3 |
| 4,723,584 A | * | 2/1988 | Yamaguchi | B60C 11/12 152/902 |

(Continued)

FOREIGN PATENT DOCUMENTS

| | | |
|---|---|---|
| EP | 3763548 A1 | 1/2021 |
| JP | S62241712 A | 10/1987 |

(Continued)

OTHER PUBLICATIONS

Machine translation for Japan 2005-162197 (Year: 2023).*

(Continued)

*Primary Examiner* — Steven D Maki
(74) *Attorney, Agent, or Firm* — Merchant & Gould P.C.

(57) ABSTRACT

A tread block arrangement is for a tire or for a tread band for a tire. The tread block arrangement includes a tread block having at least a first sipe delimited by a first sipe wall, a second sipe wall and a bottom of the sipe. The first sipe wall and the second sipe wall are arranged parallel to each other and define a width (w) of the sipe. At least the first sipe wall has at least one inclined section in which a width of a surface of the first sipe wall in a longitudinal direction of the sipe and the width of the sipe increases towards the bottom of the sipe.

18 Claims, 6 Drawing Sheets

(56) References Cited

U.S. PATENT DOCUMENTS

| | | | | |
|---|---|---|---|---|
| 5,012,847 | A | * | 5/1991 | Fukumoto ........... B60C 11/0306 |
| | | | | 152/DIG. 3 |
| 5,503,208 | A | * | 4/1996 | Kamegawa ............ B60C 11/00 |
| | | | | 152/209.15 |
| 6,533,006 | B1 | * | 3/2003 | Siltanen ................. B60C 11/12 |
| | | | | 152/902 |
| 2003/0029537 | A1 | * | 2/2003 | Iwamura ............. B60C 11/1218 |
| | | | | 152/209.18 |
| 2008/0135149 | A1 | * | 6/2008 | Sakamaki ............... B60C 11/12 |
| | | | | 152/209.18 |
| 2009/0151833 | A1 | * | 6/2009 | Sakai ................. B29D 30/0606 |
| | | | | 152/209.25 |
| 2013/0118663 | A1 | | 5/2013 | Kishizoe |
| 2013/0153106 | A1 | * | 6/2013 | Clemmer ........... B60C 11/1218 |
| | | | | 152/209.23 |
| 2014/0130950 | A1 | * | 5/2014 | Guichon ................ B60C 11/13 |
| | | | | 152/209.18 |
| 2018/0207994 | A1 | * | 7/2018 | Joo .................... B60C 11/1218 |

FOREIGN PATENT DOCUMENTS

| | | | |
|---|---|---|---|
| JP | H09094829 A | | 4/1997 |
| JP | 2000-264023 A | * | 9/2000 |
| JP | 2005-104194 A | * | 4/2005 |
| JP | 2005-162197 A | * | 6/2005 |
| JP | 2005-193815 A | * | 7/2005 |
| WO | 2014132196 A1 | | 9/2014 |

OTHER PUBLICATIONS

Machine translation for Japan 2000-264023 (Year: 2023).*
Machine translation for Japan 2005-193815 (Year: 2023).*
Machine translation for Japan 2005-104194 (Year: 2023).*
Rod Pierce, Math is Fun, "Convex", one page, 2023 (Year: 2023).*
"Concave" vs. "Convex": What's The Difference?, Dictonary.com, seven pages, 2023 (Year: 2023).*
"Concave" vs. "Convex": What's The Difference?, Dictionary.com, six pages, 2021 (Year: 2021).*
Definition of Concave, MathsIsFun.com, one page, 2017 (Year: 2017).*
Definition of Convex, MathsIsFun.com, 2017 (Year: 2017).*
Extended European Search Report received for EP Application No. 22158118.4 on Sep. 6, 2022, 8 pgs.

* cited by examiner

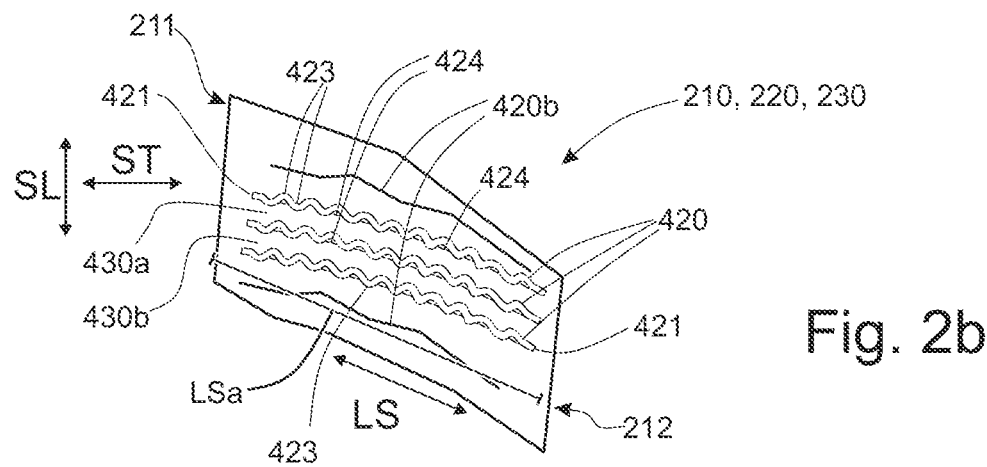
Fig. 2b
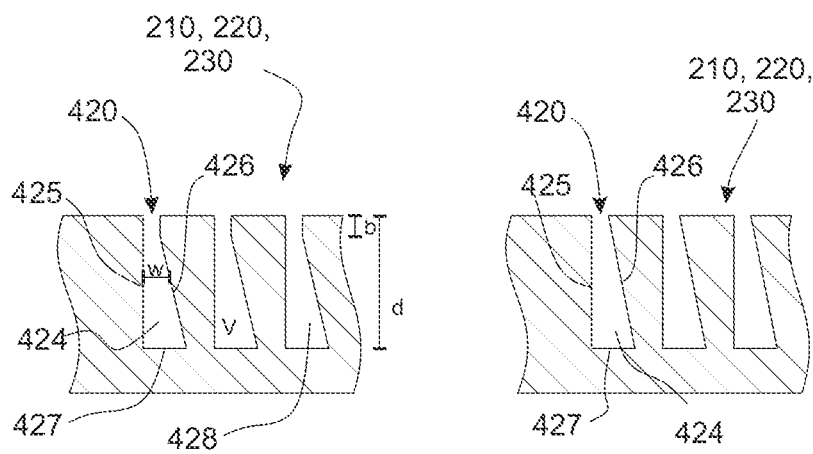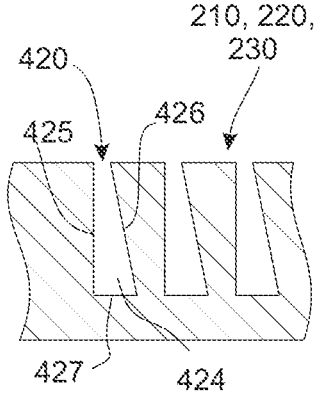
Fig. 2c              Fig. 2d

TREAD BLOCK ARRANGEMENT HAVING A SIPE

CROSS-REFERENCE TO RELATED APPLICATION

This U.S. patent application claims the benefit of European Patent Application No. EP22158118.4 filed with the European Patent Office on Feb. 23, 2022, the entire contents of which is incorporated herein by reference.

TECHNICAL FIELD

The present invention relates to a pneumatic tire (a.k.a. tyre) or a tread band having tread blocks, and being provided in the tread blocks with sipes, more particularly to an improved sipe structure or sipe arrangement of a tread block. The present invention also relates to lamella plates that are used in the manufacturing process of a pneumatic tire for making said sipe structure or sipe arrangement.

BACKGROUND OF THE INVENTION

Figure 1A:
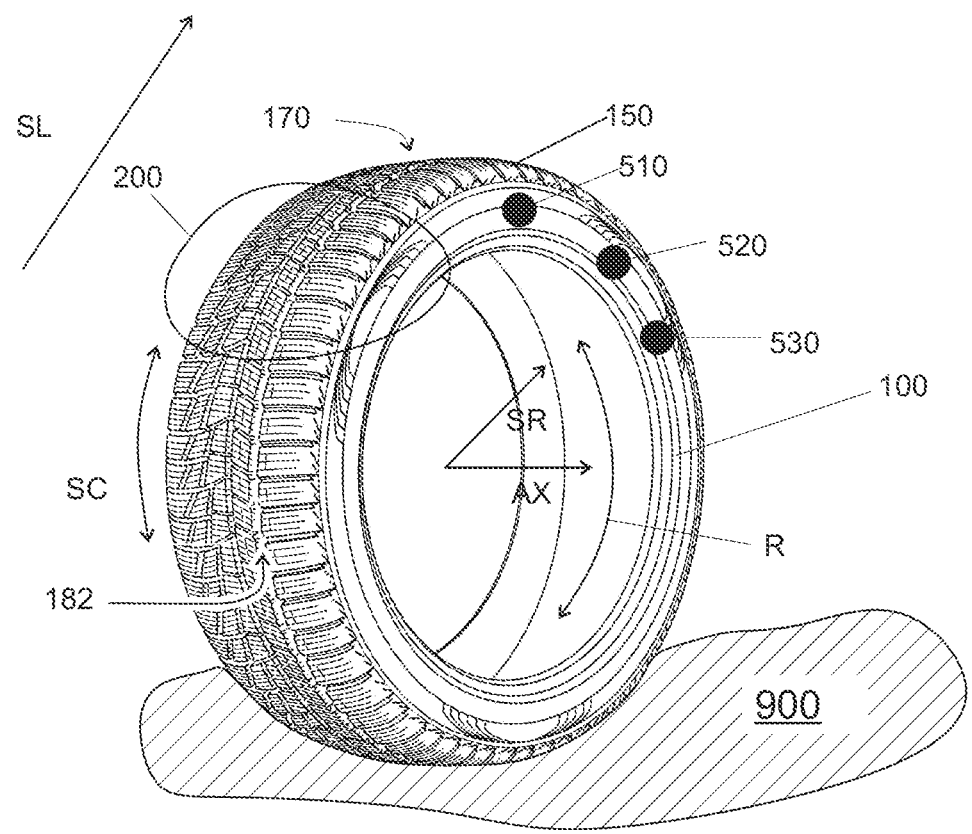

A tread of a known pneumatic tire is indicated in FIG. 1a. A pneumatic tire is known to include a tread which has circumferential and transversal grooves on its outer surface, said grooves defining a number of protruding parts, such as ribs and tread blocks. The tread is meant for a rolling contact against a ground surface, such as road. The grooves are meant for draining water and/or slush that is possibly located on the ground surface away from the tread, so that the contact between the tread and the ground surface is as good and consistent as possible. Certain types of tires such as winter tires are provided in the tread with a number of sipes at various angles with respect to a motion direction of the tire. The sipes not only serve a better tire-ground contact in rain, but also improve traction, braking and lateral stability on snow and on icy surface by trapping snow as well as providing more gripping edges. The sipes also make the rubber material to deform more easily, in effect making the tire appear softer. This also improves friction.

SUMMARY OF THE INVENTION

An object of the invention is to improve the properties of a pneumatic tire provided with lamellas and sipes in the tread block so that lamellas can work more efficiently in the sense of improved gripping and improved stability despite of wear off a surface of the tread band.

Accordingly, a tread block arrangement is disclosed. The tread block arrangement is suitable for a tire or for a tread band for a tire. The tread block arrangement comprises tread blocks. A tread block comprises one or more sipes which are formed by sipe walls and a bottom in the tread block. The sipe walls are mainly substantially parallel but at least one of the walls have at least one triangularly inclined section so that the width of the sipe increases towards the bottom at the location of the inclined section. This has the effect that, because the volume of the sipe increases towards the bottom of the sipe at the inclined section, more water can be absorbed (displaced) from the surface, which improves the grip also near the first sipe.

According to a first aspect there is provided a tread block arrangement suitable for a tire or for a tread band for a tire, the tread block arrangement comprising
  a tread block, which comprises at least:
  a sipe delimited by a first sipe wall, a second sipe wall, and a bottom of the sipe, wherein the first sipe wall and the second sipe wall are arranged parallel to each other and define a width of the sipe,
  wherein at least the first sipe wall has at least one inclined section in which a width of a surface of the first sipe wall in a longitudinal direction of the sipe and the width of the sipe increases towards the bottom of the sipe.

According to a second aspect there is provided a tire for a vehicle, the tire having a tread block arrangement comprising:
  a tread block, which comprises at least:
  a sipe delimited by a first sipe wall, a second sipe wall, and a bottom of the sipe, wherein the first sipe wall and the second sipe wall are arranged parallel to each other and define a width of the sipe,
wherein at least the first sipe wall has at least one inclined section in which a width of a surface of the first sipe wall in a longitudinal direction of the sipe and the width of the sipe increases towards the bottom of the sipe.

According to a third aspect there is provided a lamella plate for forming a sipe to a tread block arrangement suitable for a tire or for a tread band for a tire, the lamella plate comprising:
  a first surface for forming a first wall of the sipe;
  a second surface opposite to the first surface for forming a second wall of the sipe; and
  a bottom edge for forming a bottom of the sipe,
  wherein the distance between the first surface and the second surface defines a thickness of the lamella plate and a width of the sipe,
  wherein the lamella plate further comprises at least one expanded section for forming at least one inclined section at least to the first wall of the sipe, wherein a width of the surface of the expanded section in a longitudinal direction of the lamella plate and the thickness of the lamella plate increases towards the bottom edge of the lamella plate at the location of the one or more expanded sections.

The dependent claims disclose preferable embodiments. The description explains these embodiments and discloses further embodiments.

A tire according to some embodiments of the disclosure may maintain properties longer during use of the tire and some properties may even improves when the tire wears. Also the grip increases in snowy and wet and also on ice conditions due to the profile of the sipes. Furthermore, some handling properties during drive may improve.

BRIEF DESCRIPTION OF THE INVENTION

Figure 1B:
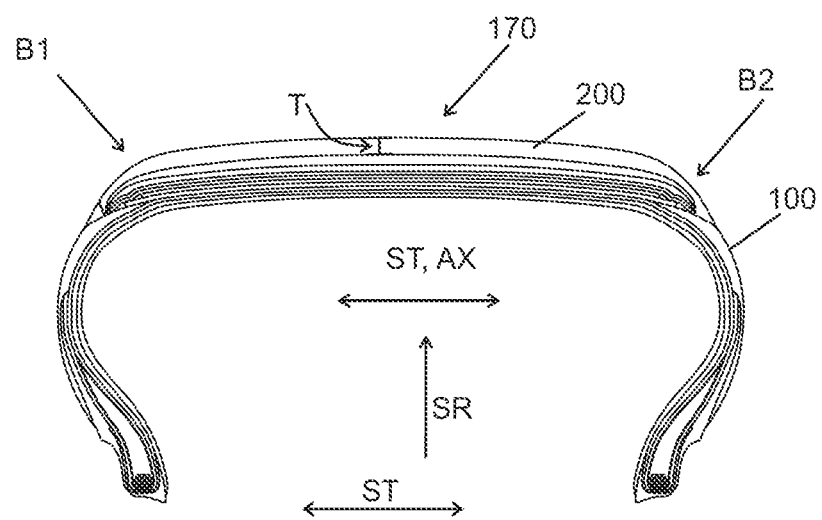
Figure 2A:
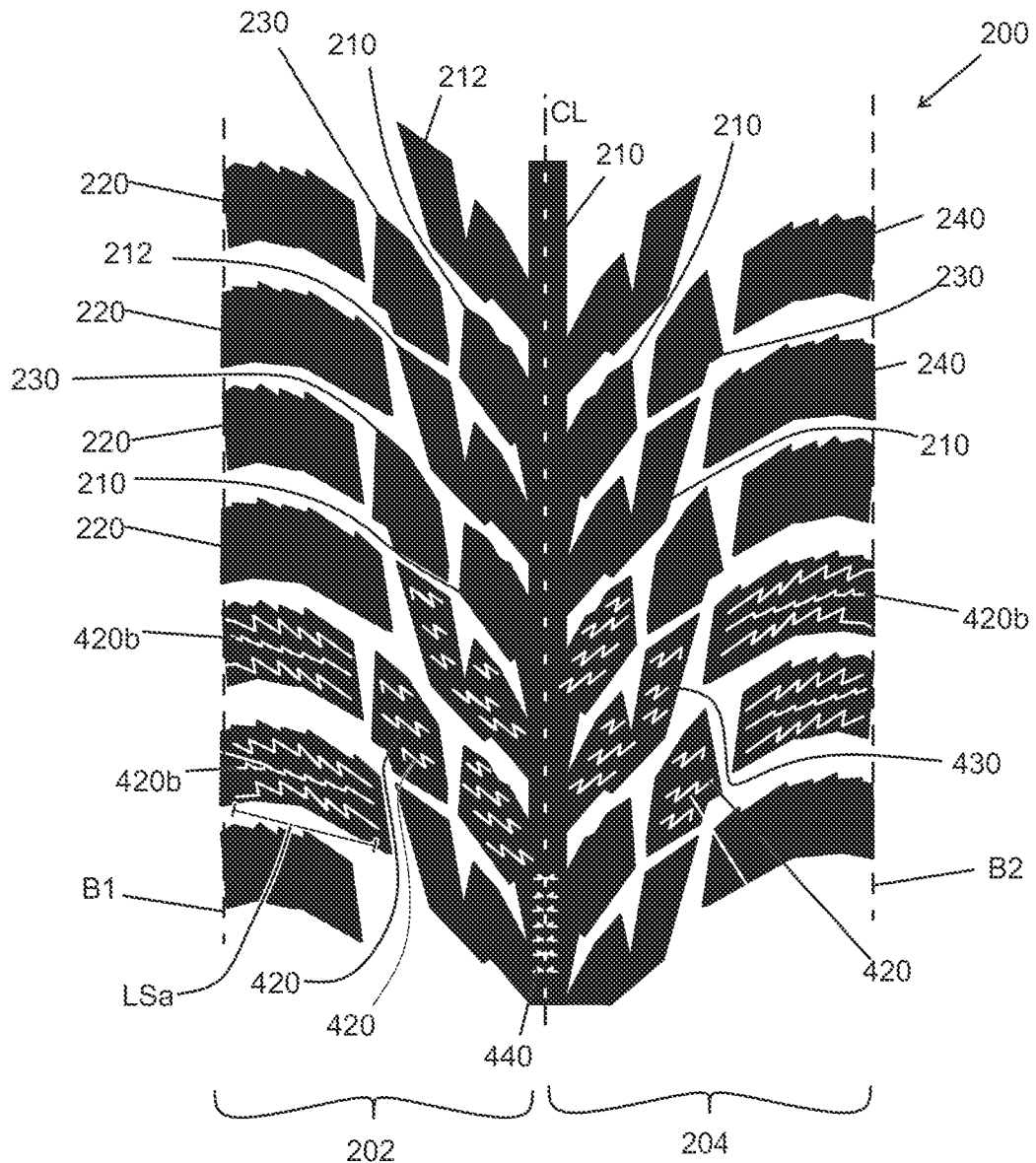
Figure 3A:
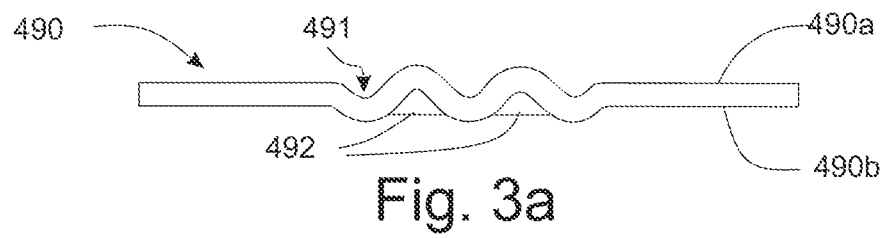
Figure 3B:
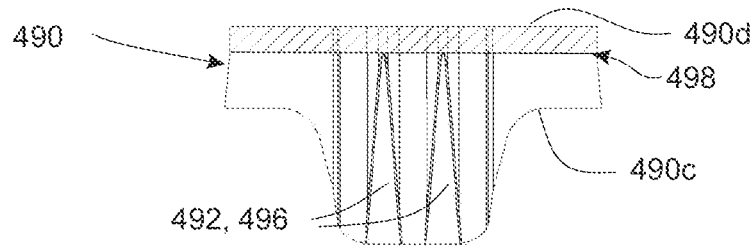
Figure 3C:
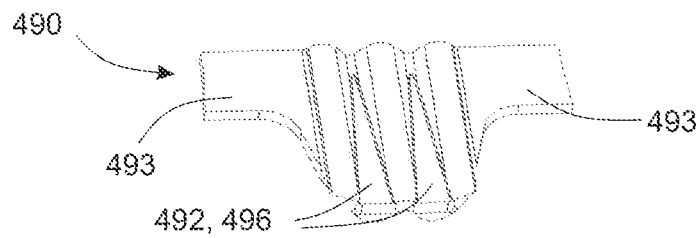
Figure 3D:
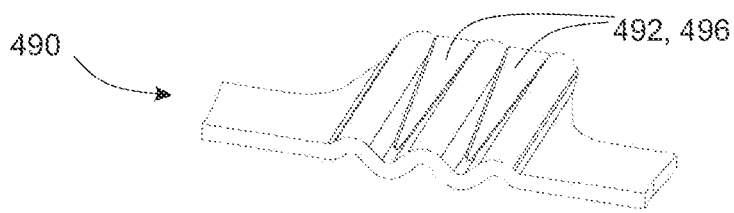
Figure 3E:
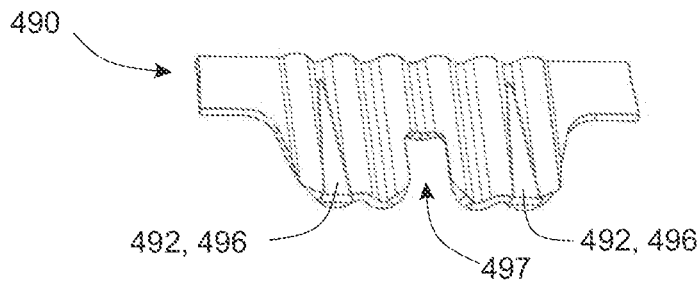
Figure 4A:
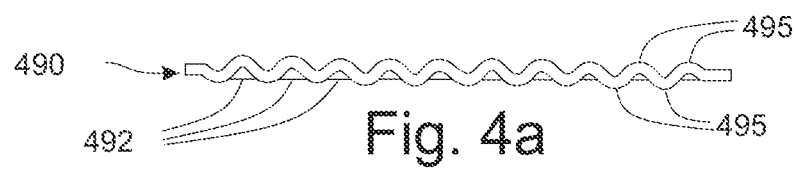
Figure 4B:
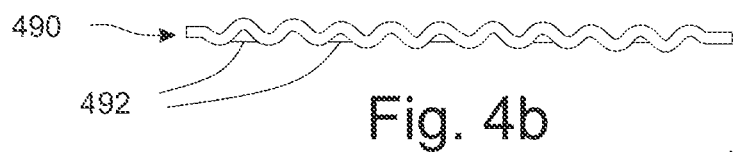
Figure 4C:
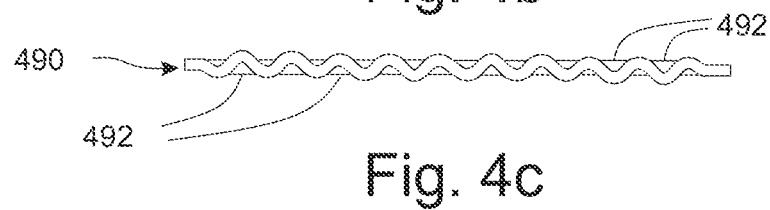
Figure 4D:
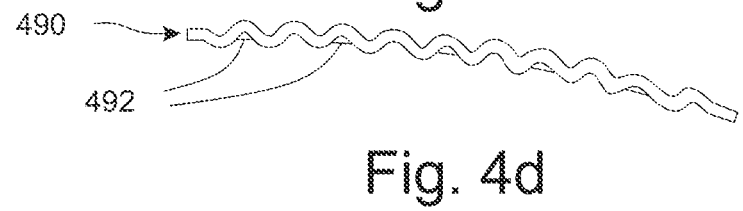
Figure 4E:
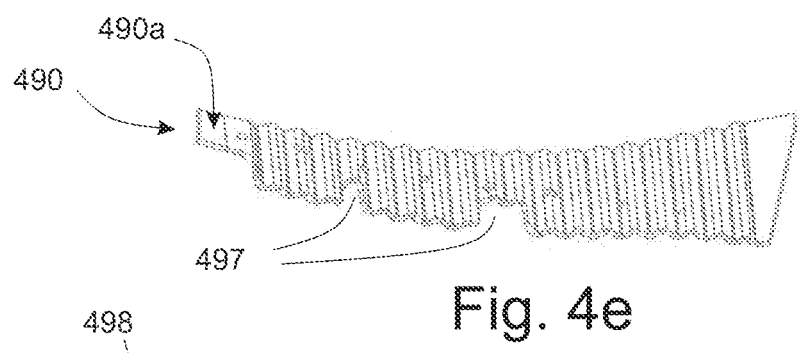
Figure 4F:
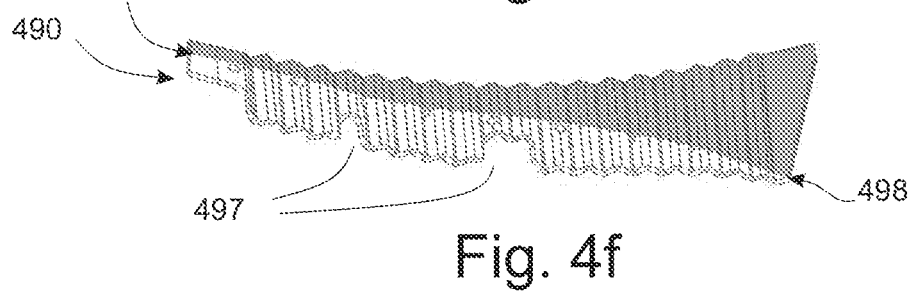
Figure 5A:
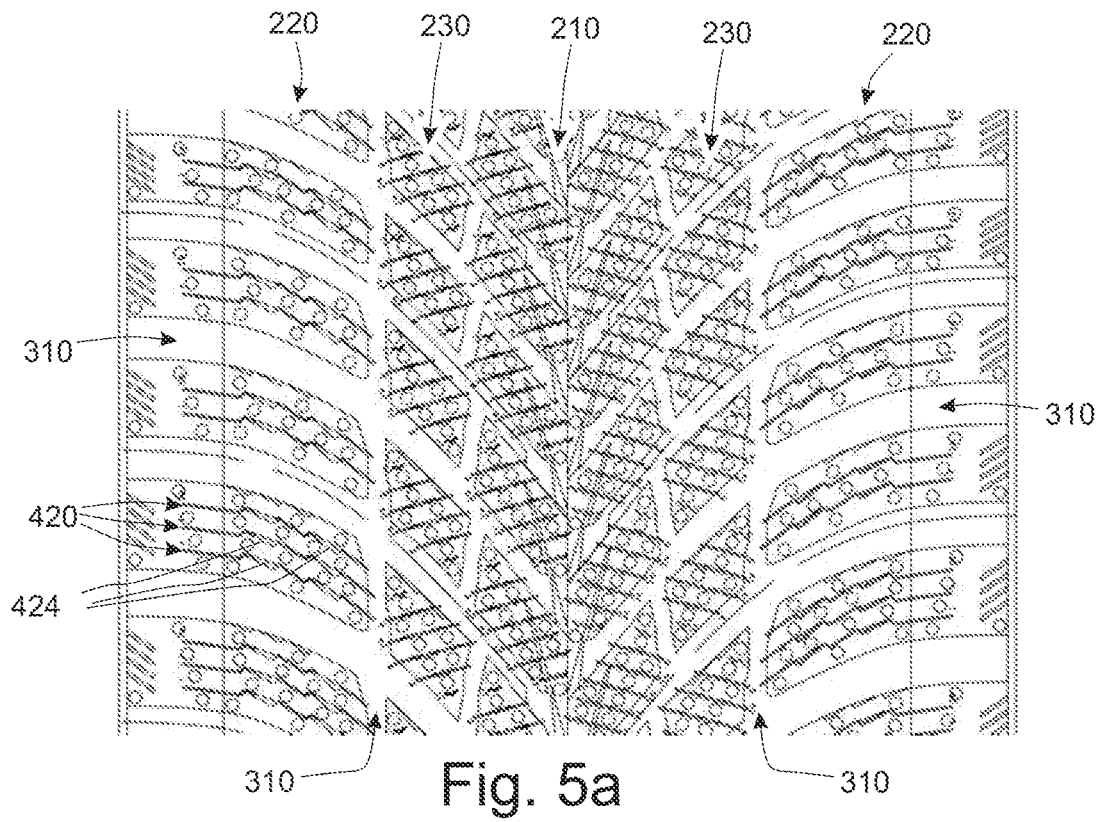
Figures 5B, 5C:
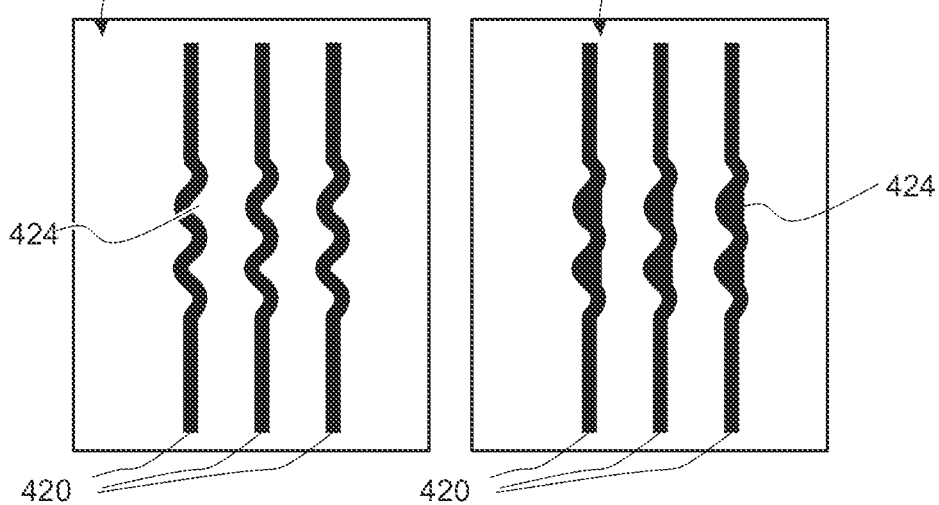

FIG. 1a shows a pneumatic tire having a tread block arrangement forming the tread of the tire, the tread block arrangement limiting a groove pattern, FIG. 1b shows half of a cross-section of a tire, FIG. 2a shows, as a top view, a part of a tread block arrangement having sipes, FIG. 2b shows, as a simplified top view, an example of a tread block having primary sipes and secondary sipes, FIGS. 2c and 2d show examples of cross sections of different kinds of primary sipes having indentations, FIG. 3a shows as a top view an example of a lamella plate for forming the primary sipes, in accordance with an embodiment of the disclosure, FIG. 3b shows as a side view the lamella plate of FIG. 3a, FIG. 3c shows as a perspective view the lamella plate of FIG. 3a, FIG. 3d shows as another perspective view the lamella plate of FIG. 3a, FIG. 3e shows as a perspective view another example of a lamella plate for forming the primary sipes, in accordance with an embodiment of the disclosure, FIGS. 4a to 4d show, as a top view, examples of different kinds of lamella plates, in accordance with some embodiments of the disclosure, FIG. 4e shows, as a perspective view, an example of a curved lamella plate having notches at one edge of the lamella plate, in accordance with an embodiment of the disclosure, FIG. 4f illustrates a section of a lamella plate which will be inside a mould and a section which will be outside the mould during manufacturing of a tire, in accordance with an embodiment of the disclosure, FIG. 5a shows, as a top view, a part of another tread block arrangement having sipes, in accordance with some embodiments of the disclosure;

FIG. 5b shows, as a top view, a part of the tread band of a new tire comprising the primary sipes of FIG. 3b, and FIG. 5c shows, as a top view, the part of the tread band of a worn tire of FIG. 4b.

DETAILED DESCRIPTION OF THE INVENTION

In this description at least the following terms are used:

A sipe refers to a narrow groove provided in a tread block of a tire.

A lamella plate refers to a plate that is usable for forming a sipe in a moulding and a vulcanization process. Thus, when a lamella plate is embedded to uncured rubber, and removed therefrom after curing the rubber, the shape of the sipe formed by the lamella plate is geometrically congruent with the lamella plate.

A lamella refers to a part of rubber arranged in between two sipes.

As is well known, a tire comprises a tread. The tread is formed of multiple tread blocks, including a first tread block and a second tread block. Each tread block may comprise a number of sipes, such as a primary sipe and a secondary sipe. Thus e.g. a first tread block may limit a primary first sipe and a secondary first sipe. Moreover, a (primary, secondary, etc.) sipe is arranged between two walls, the walls being comprised by the (first, second, etc.) tread block. These side walls are called as first and second walls. When they concern e.g. a primary sipe, they are called a first primary wall and a second primary wall. Similar notation and/or numbering is also used for some other parts of the tire.

The sipes may be totally within a tread block i.e. both ends of the sipe are inside the tread block, or one end may be inside the tread block and the other end extends to an edge of the tread block i.e. to a groove, or both ends of the sipe extend to a groove. Furthermore, some sipes of the tire may be totally within a tread block, some sipes may have one end inside the tread block and the other end extends to a groove, and/or some sipes have both ends extending to a groove.

In the following, the primary sipe, the secondary sipe, etc. as well as the first sipe, the second sipe etc. are generally called as the sipe or the primary sipe/secondary sipe, unless otherwise indicated, because the general principles of at least some embodiments are applicable to different sipes irrespective of where they are located in a tire. However, a tire may also have sipes which do not correspond with the structure of the sipes of embodiments of the disclosure. Such sipes are also called as secondary sipes in this specification.

FIG. 1a shows a pneumatic tire 100 having a tread block arrangement 200 forming a tread 170 of the tire 100. The tread 170 of the tire 100 (or a tread band 150) refers to the part that makes contact with a base 900 such as a ground surface (e.g. a road or the ground) when in use. The tread 170 is meant for a rolling contact against the base 900. The tread 170 is the outermost surface of the tread block arrangement 200. The tread block arrangement comprises tread blocks 210, i.e. blocks, as will be detailed below.

The circumferential direction of the tire 100 is indicated by the arrow R in FIG. 1a. The axial and radial directions of the tire 100 are indicated by the AX and SR, respectively. The tread block arrangement 200 can be formed onto the tire 100 e.g. in a moulding and vulcanization process. Within the tire 100, the longitudinal direction SL of the tread block arrangement is parallel to the circumferential direction SC of the tire 100; and curves along the circumferential direction SC on the tire 100. Moreover, the longitudinal direction of the tread block arrangement, i.e. the circumferential direction SC, is perpendicular to a transversal direction AX and perpendicular to the thickness T (see FIG. 1b) of the tread block arrangement 200. The thickness T is, on a tire, substantially parallel to the radial direction SR. The tread 170 of the tread band 150 faces outwards, and forms the tread 170 of the tire 100. In this way, the tread band 150 also comprises a tread block arrangement 200 forming the tread 170.

FIG. 1b shows a half of a cross section of the pneumatic tire 100. The tread 170 includes a primary boundary B1 and a secondary boundary B2 of the tread block arrangement 200, and the tread 170 is located in between these boundaries. The transversal direction ST is parallel to the axial direction AX. The radial direction SR is substantially parallel to a normal of a the tread 170, and parallel to the thickness T of the tread block arrangement 200 (or the tread band 150, if applicable). The circumferential direction SC is perpendicular to the plane of FIG. 1c (see also FIG. 1a).

The longitudinal direction of the tread block arrangement 200 is parallel to the longitudinal direction SL of the tread band 150 or parallel to the circumferential direction SC of the pneumatic tire 100; depending on whether the arrangement 200 is a part of the tread band 150 or the pneumatic tire 100. The longitudinal direction (SL, SC) may refer to either of the longitudinal directions in this disclosure unless indicated otherwise. The transversal direction (ST, AX) of the tread block arrangement 200 is parallel to the transversal direction ST of the tread band 150 or parallel to the axial direction AX of the pneumatic tire 100, depending on whether the arrangement 200 is part of the tread band 150 or the pneumatic tire 100. The thickness of the tread block arrangement 200 is parallel to the radial direction SR of the pneumatic tire 100 or the thickness of the tread band 150.

FIG. 2a shows a part of a tread block arrangement 200 of a pneumatic tire 100 in more detail. The tread block arrangement 200 comprises tread blocks 210, 220, 230, 240. In this description, a block refers to a tread block, unless otherwise indicated. Referring to FIG. 2a, a tread block arrangement 200 may comprise shoulder blocks 220, 240, middle blocks 210 and intermediate blocks 230. In this description, a block refers to a part of the tread block arrangement 200 that is separated from other blocks of the tread block arrangement 200 by a portion of a groove. In this way, a block protrudes in the radial direction SR from a bottom of the grooves. A groove has a depth and a width. The depth of a groove may be at least 6 mm, such as from 6 mm to 16 mm, or between 6 mm and 15.5 mm, or between 8 mm and 11 mm. The width of a groove may be e.g. 2 mm, or 3 mm, or 4 mm, or between 3 to 13 mm, or at most 20 mm. The width of the groove refers to a dimension that is perpendicular to the depth and a length of the groove, wherein the length of the groove is greater than the width of the groove, and the depth is parallel to a thickness T of the tread. In particular, a tread block arrangement comprises primary shoulder blocks 220 defining a primary boundary B1 of the tread block arrangement 200 (See. FIG. 2a).

The dimensions of the grooves mentioned above refer to a new tire which has not been in use, but at least the depth of the grooves decreases when the tire is in use.

As indicated in FIGS. 2a and 2b, a tread block 210, 220, 230 limits a plurality of primary sipes 420. The primary sipe 420 extends in a longitudinal direction LS of the primary sipe 420 a longer distance than in a direction of width or depth of the primary sipe 420. The longitudinal direction LS of the primary sipe 420 is indicated in FIG. 2b. If a cross-section of the primary sipe 420 has a shape of a sinusoidal line or other sinuous (a.k.a meander) pattern in the longitudinal direction, as it may have, the longitudinal direction LS follows the shape of the sipe 420, as shown in FIG. 2b. However, an average longitudinal direction LSa can be defined to extend in between the two ends of the primary sipe 420.

As indicated in FIGS. 2a and 2b, the average longitudinal direction LSa of the sipe may be transversal or substantially transversal with respect to the longitudinal direction SL of the tread band 150. For example, the average longitudinal direction LSa of the primary sipe 420 may form an angle of at most 80 degrees with a transversal direction ST, AX of the tread block arrangement 200.

It should be noted that FIG. 2a shows only some tread blocks having sipes but in practical implementations one or more sipes are formed to a majority of the tread blocks 210, 220, 230 or even to each tread block 210, 220, 230 of the tire 100.

In an embodiment, the tread block arrangement 200 comprises a primary part 202 and a secondary part 204. The primary part 202 refers to that part of tread block arrangement 200 that is left in between the longitudinal central line CL and the primary boundary B1. The secondary part 204 refers to that part of tread block arrangement 200 that is left in between the longitudinal central line CL and the secondary boundary B2.

FIG. 2b shows one tread block 210, 220, 230 as a top view, according to an example of the disclosure. The tread block 210, 220, 230 comprises three primary sipes 420, but it is possible that a tread block 210, 220, 230 can have only one or two primary sipes or more than three primary sipes 420. It may also be possible that some tread blocks are without any sipes 420 or have only secondary sipes 420b.

The primary sipes 420 of the tread block 210, 220, 230 of FIG. 2b do not extend from one edge 211 of the tread block to the other edge 212 of the tread block 210, 220, 230. In other words, neither end 421 of the primary sipe 420 do not coincide an edge 211 of the tread block in the longitudinal direction of the tread block. However, the primary sipes 420 may also be formed so that one or both ends 421 extend to the edge 211 of the tread block. In that case, water and slush removal efficiency of the primary sipes may be higher than when neither end of the primary sipes stretches to an edge of the tread block, as is illustrated in FIG. 2b.

It should be noted that some of the primary sipes 420 of the tread block 210 may extend to at least one edge 211 of the tread block and some other primary sipes 420 of the tread block 210 do not extend to neither edge 211 of the tread block.

In FIG. 2b the primary sipes 420 have curved sections 423 and some of the curved sections 423 have the inclined sections 424. The inclined sections 424 form at least one indentation 428 to the primary sipe 420, wherein a distance between the first sipe wall 425 and the second sipe wall 426 (FIG. 2c) increases towards the bottom 427 of the sipe at the location of the inclined section 424, but the width of the primary sipe 420 at both ends 421 in a longitudinal direction of the sipe is without the indentations. The indentations are not normally visible when the tread band is looked at the top but may become partly or totally visible when the tire wears. FIGS. 5b and 5c illustrate this showing a part of the tread band of a new tire (FIG. 5b) and a corresponding part of a worn tire (FIG. 5c). In this figures the black lines show the sipes 420 viewed above the tire.

The cross sections of a tread block of the examples shown in FIGS. 2c and 2d are illustrative only and they are not drawn in scale and they are not showing possible details behind the cross section. FIG. 2c depicts an example where the inclined section 424 does not start immediately at the top of the surface of the tread block 210 but at a distance b from the surface of the tread block 210. Hence, the width w of the sipe may first be substantially constant and starts to increase at the location where the inclined section 424 starts. FIG. 2d depicts an example where the inclined section 424 starts immediately at the top of the surface of the tread block 210.

The indentation of the inclined section 424 is formed in such a way that in the longitudinal direction of the inclined section 424 the width of the indentation 428 in the longitudinal direction of the sipe 420 increases towards the bottom 427 of the sipe and also the depth of the indentation 428 increases towards the bottom 427 of the sipe. The depth of the indentation 428 means the direction transversal to the longitudinal direction of the sipe 420. Hence, the form of the indentation 428 resembles a triangle.

It should be noted that the depth d of the sipe need not be constant but may vary in the longitudinal direction of the sipe. Respectively, the height h of the lamella plate 490 may vary in the longitudinal direction. For example, the example of the lamella plate 490 illustrated in FIGS. 4e and 4f is narrower (the height h is smaller) at one end than at the other end. This kind of lamella plate 490 may be used, for example, to form sipes at the shoulder regions B1, B2 of the tread 170.

Furthermore, the lamella plate 490 may have one or more locations in which the height h of the lamella plate 490 is much smaller than at other locations of the lamella plate 490. The example of FIGS. 4e and 4f show these narrower sections as notches 497. This has the consequence that the bottom of the sipe is lower at the corresponding locations. This may improve the stiffness of the lamellas between two adjacent sipes.

It should be noted that although FIGS. 4e and 4f show both the notches and regularly narrowing lamella plate, the notches 497 may also be implemented in lamella plates which otherwise has a substantially constant width, and the regularly narrowing lamella plate need not have the notches.

As an example, the depth of the lower (shallow) parts of the primary sipe (and the narrower parts 497 of the lamella plate 490) is from 0.3 mm to 7 mm, preferably from 2 mm to 4.0 mm. The depth is preferably as small as practically possible, keeping in mind that a corresponding flat part of the lamella plate 490 requires some strength to join the tall parts. As an example, the depth of the shallow parts may be 0.3 mm, when the lamella plate 490 is made from steel. In an embodiment, the depth of both of the deep parts are from 5 mm to 15 mm, preferably from 6 mm to 8 mm. Typically the deep parts are somewhat shallower than the grooves. This also improves the stiffness of the tread blocks, while maintaining the water drainage properties of the grooves. As an example the depths of both of the deep parts are at most 90% of a depth of a groove of the tire. A depth of the grooves may be e.g. at least 6 mm, such as from 6 mm to 16 mm, or between 6 mm and 15.5 mm, or between 8 mm and 11 mm.

When considering the shoulder blocks 220 i.e. those blocks at the edges of the tire 100, one edge of the tread block may end to a groove and the opposite end of the tread block may end to the edge of the tire. On the other hand, when considering the middle blocks 210 and intermediate blocks 230, i.e. those blocks between the shoulder blocks in the axial direction AX of the tire 100, both edges of the tread block 210, 230 may end to a groove in the tread.

Such a primary sipe 420 has the effect that, because of the shallow part (or shallow parts), the primary sipe 420 does not significantly affect the stiffness of the tread block, in which the primary sipe 420 is arranged. The stiffness is not significantly affected, since the shallow part or shallow parts bind the neighbouring lamellas 430a, 430b together, whereby the stiffness remains intact. The term "lamella" refers to the rubber material in between two neighbouring sipes or in between a sipe and a groove. A lamella 430 is typically relatively thin, e.g. from 1 mm to 7 mm, the thickness referring to the distance in between the sipes (or the sipe and groove) defining the lamella. Advantageously the lamella is from 3 to 7 mm, preferably from 4 to 6 mm thick. The aforementioned neighbouring lamellas 430a, 430b are the two lamellas, in between which the primary sipe 420 (and only the primary sipe 420) is left. FIG. 2b shows an example of the first lamella 430a and the second lamella 430b. Hence, a wall of the first lamella 430a forms the first sipe wall 425 and a wall of the second lamella 430b opposite to the wall of the first lamella 430a forms the second sipe wall 426, wherein a distance between the first lamella 430a and the second lamella 430b defines the width of the first sipe 420, and a height of the first lamella 430a and the second lamella 430b define a height of the first sipe 420.

The length of the primary sipe 420 described above may affect handling properties of a vehicle in such a manner that shorter sipes do not soften the tread block as much as a longer sipe may do. The inclined sections 424 forming the indentations 428 has the advantage that when the tire wears and the depth of the sipes and the height of the lamellas decreases, the stiffness of the lamellas does not significantly increase due to the indentations 428. Namely, the thickness of the lamellas is also smaller at the locations of the indentations 428. If the sipes did not have such indentations but had constant width along the height of the sipe and, respectively, the lamellas had constant thickness, the lamellas would become stiffer due to the decreased height and constant thickness. These kind of sipes need not be arranged to all tread blocks but it may be sufficient to form them to a part of the tread blocks.

The length of the sipe 420 may affect to the number of indentations 428 in the sipe 420. Shorter sipes 420 may have less indentations 428 than longer sipes 420.

In accordance with an embodiment, longer sipes 420 are arranged in tread blocks at shoulder regions B1, B2 of the tread 170 and shorter sipes 420 are arranged in tread blocks at the central part of the tread 170.

Tires are typically classified based on the speed range in which the tire is intended to be used. There are different kinds of speed ranges (tire speed ratings, tire speed classes) wherein tires for slower speeds may have different structure than tires for higher speeds. Some examples of such speed classes include 160 km/h, 170 km/h, 180 km/h, . . . , 270 km/h, 300 km/h. For example, tires for the top speed classes the sipes may not extend to edges of tread blocks, wherein the lamellas may behave better in high speeds compared to a situation in which at least some of the sipes would extend to either or both edges of the tread blocks.

As a further feature which may need to be taken into account when designing the sipes and lamellas is how many curves the sipes will have. Some tires may be designed to be used in conditions in which snow will not usually be an issue (e.g. in central Europe) wherein properties in snowy surfaces may not be taken into account but perhaps rain will be more important factor to be dealt with.

The primary sipes 420 can be manufactured, for example, by using the above mentioned lamella plate 490, an example of which is depicted in FIG. 3a. In practice, a plurality of such lamella plates 490 shall be used in manufacturing of a tire 100, but it is sufficient to describe the process using one lamella plate 490 as an example. The lamella plate 490 is inserted into the tire 100 or tread band 150 during vulcanization of the polymer material, e.g. rubber, of the tread 170. After vulcanization, the lamella plate 490 may be removed from the tire 100 or the tread band 150.

In the following, some details of the lamella plate 490 of FIGS. 3a to 3e and the corresponding primary sipe 420 will be described in more detail. FIG. 3a shows as a top perspective view an example of the lamella plate 490 for forming the primary sipes, in accordance with an embodiment of the disclosure, FIG. 3b shows as a side view the lamella plate of FIG. 3a. The hatched region in FIG. 3b illustrates which part of the lamella plate 490 will be inside a mould, wherein the other part below the hatched region will be outside the mould during manufacturing of the tire 100, in accordance with an embodiment of the disclosure. The border between these two sections is indicated with the reference numeral 498. After the moulding or vulcanization process the form of the sipe corresponds the section which is outside the mould i.e. the not-hatched part of the lamella plate 490.

FIG. 3c shows as a perspective view the lamella plate of FIG. 3a, FIG. 3d shows as another perspective view the lamella plate of FIG. 3a, and FIG. 3e shows as a perspective view another example of a lamella plate for forming the primary sipes, in accordance with an embodiment of the disclosure, The lamella plate 490 has a first surface 490a for forming the first wall 424 of the sipe 420 and a second surface 490b opposite to the first surface 490a for forming the second wall 426 of the sipe 420 and a bottom edge 490c for forming the bottom of the sipe. The distance between the first surface 425 and the second surface 426 of the sipe 420 defines a thickness of the lamella plate 490 and a width w of the sipe 420.

Referring to FIGS. 3a to 3d, the lamella plate 490 comprises sections 491 which have substantially constant thickness i.e. the distance between the a surface 490a and a second surface 490b. The lamella plate 490 also has one or more expanded sections 492. When the primary sipe 420 is formed, the expanded sections 492 of the lamella plate 490 form the inclined sections 424.

In accordance with an embodiment of the lamella plate 490, a top of the expanded section 492 is below a top edge 490d opposite to the bottom edge 490c of the lamella plate 490, a bottom of the expanded section 492 is at a bottom edge 490c of the lamella plate 490, and a thickness of the lamella plate 490 is constant at the top edge 490d.

Alternatively, the lamella plate 490 may be formed by a sintering process or 3D (three dimensional) printing process.

In the examples of FIGS. 3a to 3e the add-on parts 496 are kind of triangles having two sides and a hypotenuse.

In the example of FIG. 3e there are two expanded sections 492 and a notch 497 in between.

FIGS. 4a to 4d show, as a top view, examples of different kinds of lamella plates, in accordance with some embodiments of the disclosure. In FIG. 4a the lamella plate 490 has expanded sections 492 at each curved section on one side of the lamella plate 490. In FIG. 4b the lamella plate 490 has expanded sections 492 at every other curved section on one side of the lamella plate 490. In FIG. 4c the lamella plate 490 has expanded sections 492 at each curved section on both sides of the lamella plate 490. FIG. 4d shows an example of the lamella plate 490 having expanded sections 492 at every other curved section on one side of the lamella plate 490 and the lamella plate 490 has been slightly bent away from a straight line.

If the tire 100 will also have secondary sipes 420b which do not have the inclined sections they can be formed in the same way by utilizing a lamella plate designed for that purpose (not shown).

As an alternative for using the lamella plates 490 in the manufacturing of the sipes to a tire 100, a moulding or vulcanization process may be utilized. In that case a mould having a mirror image of the intended form of the tire 100 (including the grooves and sipes) is formed.

The sipe 420 made by the lamella plate 490 has the same form as the lamella plate 490 but as a mirrored image. Hence, if the inclined sections of the primary sipe should be convex, the expanded sections of the lamella plate are respectively concave, FIG. 4e shows, as a perspective view, an example of a curved lamella plate 490 having notches 497 at one edge of the lamella plate, in accordance with an embodiment of the disclosure. FIG. 4f illustrates in the curved lamella plate 490 of FIG. 4e how the lamella plate 490 will be located in a mould during manufacturing of a tire 100. The shaded part illustrates a section of the lamella plate 490 which will be inside a mould and another section which will be outside the mould during manufacturing of the tire 100, in accordance with an embodiment of the disclosure. The border between these two sections is indicated with the reference numeral 498. After the moulding or vulcanization process the form of the sipe corresponds the section which is outside the mould i.e. the not-shaded section of the lamella plate 490.

It should be noted that the holes in the lamella plate 490 of FIGS. 4e and 4f are for the curing process of the tire.

The primary sipes 420 may be transversal sipes. A transversal sipe 420 extends in an average longitudinal direction LSa that forms an angle of at most 80 degrees with the transversal direction ST, AX of the tread block arrangement 200. What has been said above about the longitudinal direction LS and the average longitudinal direction LSa of the primary sipe 420 applies to also to directions of other sipes, mutatis mutandis.

In an embodiment, at least a half of the middle blocks 210 are provided with primary sipes 420 as discussed above for one of the middle blocks 210. Thus, in an embodiment, at least half of the middle blocks 210 are provided with a primary sipe 420.

In an embodiment, also the primary shoulder blocks 220 are provided with primary sipes 420 as discussed above for one or more of the primary shoulder blocks 220.

FIG. 5a shows another example of a part of a tread block arrangement 200 of a tire 100. In this example the tread block arrangement 200 comprises shoulder blocks 220, middle blocks 210 and intermediate blocks 230.

Referring to FIG. 2a, a tread 170 typically comprises also secondary shoulder blocks 240 defining a secondary boundary B2 such that a central line CL is left in between the primary boundary B1 and the secondary boundary B2. FIG. 2a shows the primary shoulder blocks 220 and the secondary shoulder blocks 240 in addition to the primary boundary B1 and the secondary boundary B2, and the central line CL. In addition the curved line CP denotes a central part of the tread 170 irrespective of its details. The central part CP comprises blocks.

In an embodiment, at least half of the secondary shoulder blocks 240 are provided with primary sipes 420, and at least the secondary sipes 420b for one of the secondary shoulder blocks 240. In an embodiment, all the secondary shoulder blocks 240 are provided with primary sipes 420, at least the secondary sipes 420b for one or more of the secondary shoulder blocks 240.

As indicated above, each block 210, 220 of the tread block arrangement 200 is separated from another block 210, 220 of the tread block arrangement 200 by a portion of a groove pattern 310.

The sipes discussed above may be used in winter tires or in summer tires or in so called all weather or all season tires. A hardness of a tread material of a summer tire is typically in the range 60 to 72 Sh(A), i.e. hardness of measured by the Shore scale, durometer type A at the temperature 23° C.

However, sipes are preferably used in winter tires for the reason discussed above. However, in winter tires, preferably also the tread material per se is reasonably soft. A hardness of a tread material of a winter tire is typically in the range 48 to 59 Sh(A).

Therefore, in an embodiment, the tread blocks 210, 220, 230, 240 of the tread block arrangement 200 are made of rubber having the hardness 48 to 72 Sh(A). Preferably, the tread blocks 210, 220, 230, 240 of the tread block arrangement 200 are made of rubber having the hardness 48 to 59 Sh(A).

A tire 100 having the tread block arrangement 200 as described above, may comprise a first marking (not shown) indicative of the tire 100 being suitable for use as a winter tire. A groove pattern of a winter tire is typically such that a direction of rotation of the tire 100 is defined for driving forward. Therefore, in an embodiment, the tire 100 comprises a second marking (not shown) indicative of a direction of rotation of the tire when driving forward.

A groove pattern refers to a pattern formed by grooves of the tire. Like a sipe, a groove is a valley in the tread, however, a width of a groove is typically much larger than that of a sipe. Grooves define the tread blocks by separating tread blocks from each other. A groove has a depth and a width. Typically, a depth of a groove is at least 6 mm, such as at least 8 mm, such as from 6 mm to 50 mm. However, the depth needs not be constant. Moreover, near sidewalls of a tire, a depth of a groove may be very small. In fact, the depth may decrease to zero towards the sidewall, depending on the shape of the shoulder area of the tire. Typically, a width of a groove is more than 3 mm, such as more than 4 mm. However, at or near a central area of the tread, a width of a groove may be less. In a central area of the tread, a width of a groove may be e.g. 1.5 mm or more.

To further improve grip, the tread 110 may be provided with studs (not shown). Such studs improve friction on icy and snowy roads. However, the tread 110 formed by the tread block arrangement 200 is also applicable as a tread of a studless tire. A studless tire may be a summer tire or a winter tire. The tread block arrangement 200 may limit an indicator (not shown) indicative of depth of the groove 120 (i.e. a wear indicator of the tire 100). The indicator may also be indicative of the of the groove 120 having a depth that is sufficient or insufficient for driving on a snowy road.

In accordance with an embodiment of the disclosure a top of the inclined section 424 is below a top of the sipe 420 and a bottom of the inclined section is at the bottom 427 of the sipe.

In accordance with an embodiment of the disclosure the distance between the first sipe wall 425 and the second sipe wall 425 is constant at the top of the sipe 420 in a longitudinal direction LS of the sipe 420.

In accordance with an embodiment of the disclosure the first sipe wall 425 has a plurality of inclined sections 424 to form a plurality of indentations 428.

In accordance with an embodiment of the disclosure the first sipe wall 425 has alternately concave sections and convex sections and the second sipe wall 426 has convex sections opposite to the concave sections of the first sipe wall 425 and concave sections opposite to the convex sections of the first sipe wall 425, wherein the at least one inclined section is at the convex section of the first sipe wall 425.

In accordance with an embodiment of the disclosure the first sipe wall 425 has the inclined section 424 at every convex section, or at every other convex section, or less frequent than every other convex section.

In accordance with an embodiment of the disclosure both the first sipe wall 425 and the second sipe wall 426 have one or more inclined sections 424.

In accordance with an embodiment of the disclosure the surface of the inclined section 424 is a triangle having a base and a top vertex, wherein the base is nearer the bottom of the sipe 420 than the top vertex.

In accordance with an embodiment of the disclosure the tread block arrangement 200 comprises at least a first lamella 430a and a second lamella 430b, wherein a wall of the first lamella 430a forms the first sipe wall 425 and a wall of the second lamella 430b opposite to the wall of the first lamella 430a forms the second sipe wall 426, wherein a distance between the first lamella 430a and the second lamella 430b defines the width w of the first sipe 420, and a height of the first lamella 430a and the second lamella 430b define a height h of the first sipe 420.

In accordance with an embodiment of the disclosure the top of the sipe forms a sinusoidal pattern.

In accordance with an embodiment of the disclosure the inclined section 424 starts from a predetermined distance greater than zero from the top of the sipe 420.

In accordance with an embodiment of the disclosure the first sipe wall 425 and the second sipe wall 426 have a plurality of indentations 424 so that indentations of the first sipe wall 425 and indentations of the second sipe wall 426 are located in an alternating manner in a longitudinal direction LS of the sipe 420.

In accordance with an embodiment of the disclosure a width w of the sipe 420 at both ends in a longitudinal direction LS of the sipe 420 is without the indentations, wherein a width w of the sipe at both ends is constant.

In accordance with an embodiment of the disclosure a width w of the sipe 420 at the location of the indentations 424, which are not visible from the top of the sipe 420 in a new tire, but which become visible from the top of the sipe 420 in a used tire, are indicative of weariness of the tread block arrangement 200.

In accordance with an embodiment of the disclosure the tire 100 comprises a plurality of tread blocks 210, 220, 230, 240 around a circumference of the tire 100.

In accordance with an embodiment of the disclosure only a part of the plurality of tread blocks 210, 220, 230, 240 of the tire 100 comprises sipes 420 having inclined sections 424.

In accordance with an embodiment of the disclosure the tire 100 comprises shoulder tread blocks 210, 240 at both edges of the tread block arrangement 200, and middle tread blocks 210 between the shoulder tread blocks in a transversal direction of the tread block 200 arrangement with respect to the circumferential direction SC of the tire 100, wherein only the shoulder tread blocks 210, 240 comprise sipes 420 having inclined sections 424.

In accordance with an embodiment of the disclosure a top of the expanded section 492 of the lamella plate 490 is below a top edge 490d opposite to the bottom edge 490c of the lamella plate 490, a bottom of the expanded section 492 is at a bottom edge 490c of the lamella plate 490, and a thickness of the lamella plate 490 is constant at the top edge 490d.

In accordance with an embodiment of the disclosure the distance between the first sipe wall 425 and the second sipe wall 426 is constant at the top of the sipe 420.

In accordance with an embodiment of the disclosure the lamella plate 490 comprises a plurality of deflection points 495 (see FIG. 4a) so that the deflection points 495 form a sinusoidal pattern.

In accordance with an embodiment of the disclosure the lamella plate 490 comprises wider sections 493 (see FIG. 3c) at both ends of the lamella plate, wherein the wider sections 493 at both ends of the lamella plate 490 are without the expanded sections 492.

In accordance with an embodiment of the disclosure only a part of the plurality of tread blocks 210, 220, 230, 240 of the tire comprises sipes 420 having inclined sections 424.

In accordance with an embodiment of the disclosure the tire comprises shoulder tread blocks 210, 240 at both edges of the tread block arrangement 200, and middle tread blocks 210 between the shoulder tread blocks in a transversal direction of the tread block 200 arrangement with respect to a circumferential direction SC of the tire 100, wherein only the middle tread blocks 210 comprise sipes 420 having inclined sections 424.

In accordance with an embodiment of the disclosure the first surface 490a of the lamella plate 490 has alternately concave sections and convex sections and the second surface 490b has convex sections opposite to the concave sections of the first surface 490a and concave sections opposite to the convex sections of the first surface 490a, wherein the at least one expanded section 492 is at the concave section of the first surface 490a.

In accordance with an embodiment of the disclosure the surface of the expanded section 492 of the lamella plate 490 is a triangle having a base and a top vertex, wherein the base is nearer the bottom edge 490c of the lamella plate 490 than the top vertex.

The invention claimed is:

1. A tread block arrangement for a tire or for a tread band for a tire, the tread block arrangement comprising a tread block, which comprises at least:

a sipe delimited by a first sipe wall, a second sipe wall, and a bottom of the sipe, wherein the first sipe wall and the second sipe wall are arranged parallel to each other and define a width of the sipe, wherein at least the first sipe wall has at least one inclined section in which a width of a surface of the at least one inclined section in a longitudinal direction of the sipe and the width of the sipe increases towards the bottom of the sipe, wherein the first sipe wall comprises convex sections and concave sections, and wherein the at least one inclined section is at every other convex section, or less frequently than at every other convex section; and wherein only the first sipe wall comprises the at least one inclined section.

2. The tread block arrangement according to claim 1, wherein the first sipe wall has a plurality of the inclined sections.

3. The tread block arrangement according to claim 1, wherein the second sipe wall has convex sections opposite to the concave sections of the first sipe wall and concave sections opposite to the convex sections of the first sipe wall, wherein the at least one inclined section is at the convex section of the first sipe wall.

4. The tread block arrangement according to claim 1, wherein a surface of the inclined section is a triangle having a base and a top vertex, wherein the base is nearer the bottom of the sipe than the top vertex.

5. The tread block arrangement according to claim 1 comprising at least:
a first lamella, and
a second lamella,
wherein a wall of the first lamella forms the first sipe wall and a wall of the second lamella opposite to the wall of the first lamella forms the second sipe wall,
wherein a distance between the first lamella and the second lamella defines the width of the first sipe, and a height of the first lamella and the second lamella define a height of the first sipe.

6. The tread block arrangement according to claim 1, wherein a top of the sipe forms a sinusoidal pattern.

7. The tread block arrangement according to claim 1, wherein the inclined section starts from a predetermined distance greater than zero from a top of the sipe.

8. The tread block arrangement according to claim 1, wherein a surface of the inclined section is flat.

9. The tread block arrangement according to claim 1, wherein the first sipe wall and the second sipe wall have a plurality of indentations so that indentations of the first sipe wall and indentations of the second sipe wall are located in an alternating manner in a longitudinal direction of the sipe.

10. The tread block arrangement according to claim 9, wherein a width of the sipe at both ends in a longitudinal direction of the sipe is without the indentations, wherein a width of the sipe at both ends is constant.

11. A tire for a vehicle comprising the tread block arrangement according to claim 1.

12. The tire according to claim 11, wherein only a part of the plurality of tread blocks comprises sipes having inclined sections.

13. The tire according to claim 11 comprising shoulder tread blocks at both edges of the tread block arrangement, and middle tread blocks between the shoulder tread blocks in a transversal direction of the tread block arrangement with respect to a circumferential direction (SC) of the tire, wherein only the middle tread blocks comprise sipes having inclined sections.

14. A lamella plate for forming a sipe to a tread block arrangement for a tire or for a tread band for a tire, the lamella plate comprising:
a first surface for forming a first wall of the sipe;
a second surface opposite to the first surface for forming a second wall of the sipe; and
a bottom edge for forming a bottom of the sipe,
wherein a distance between the first surface and the second surface defines a thickness of the lamella plate and a width of the sipe,
wherein the lamella plate further comprises at least one expanded section for forming at least one inclined section at least to the first wall of the sipe, wherein a width of a surface of the expanded section in a longitudinal direction of the lamella plate and the thickness of the lamella plate increases towards the bottom edge of the lamella plate,
wherein the first surface of the lamella plate comprises convex sections and concave sections, and wherein the at least one expanded section is at every other concave section, or less frequently than at every other concave section; and
wherein only the first surface of the lamella plate comprises the at least one expanded section.

15. The lamella plate according to claim 14, wherein the second surface has convex sections opposite to the concave sections of the first surface and concave sections opposite to the convex sections of the first surface, wherein the at least one expanded section is at the concave section of the first surface.

16. The lamella plate according to claim 14, wherein
a top of the expanded section is below a top edge of the lamella plate opposite to the bottom edge;
a bottom of the expanded section is at a bottom edge of the lamella plate; and
a thickness of the lamella plate is constant at the top edge.

17. The lamella plate according to claim 14, wherein the surface of the expanded section is a triangle having a base and a top vertex, wherein the base is nearer the bottom edge of the lamella plate than the top vertex.

18. The lamella plate according to claim 14, wherein the surface of the expanded section is flat.

* * * * *